UNITED STATES PATENT OFFICE.

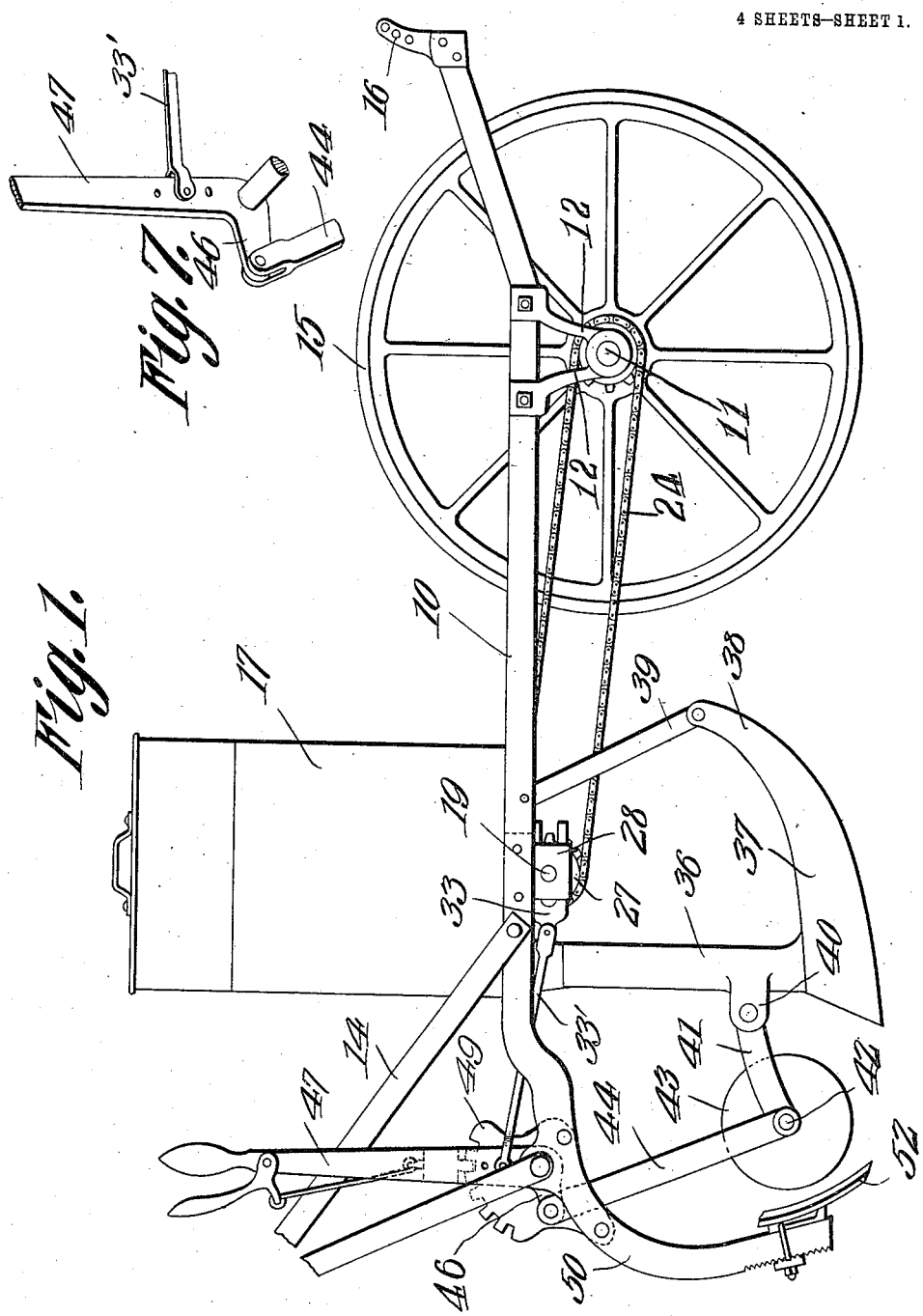

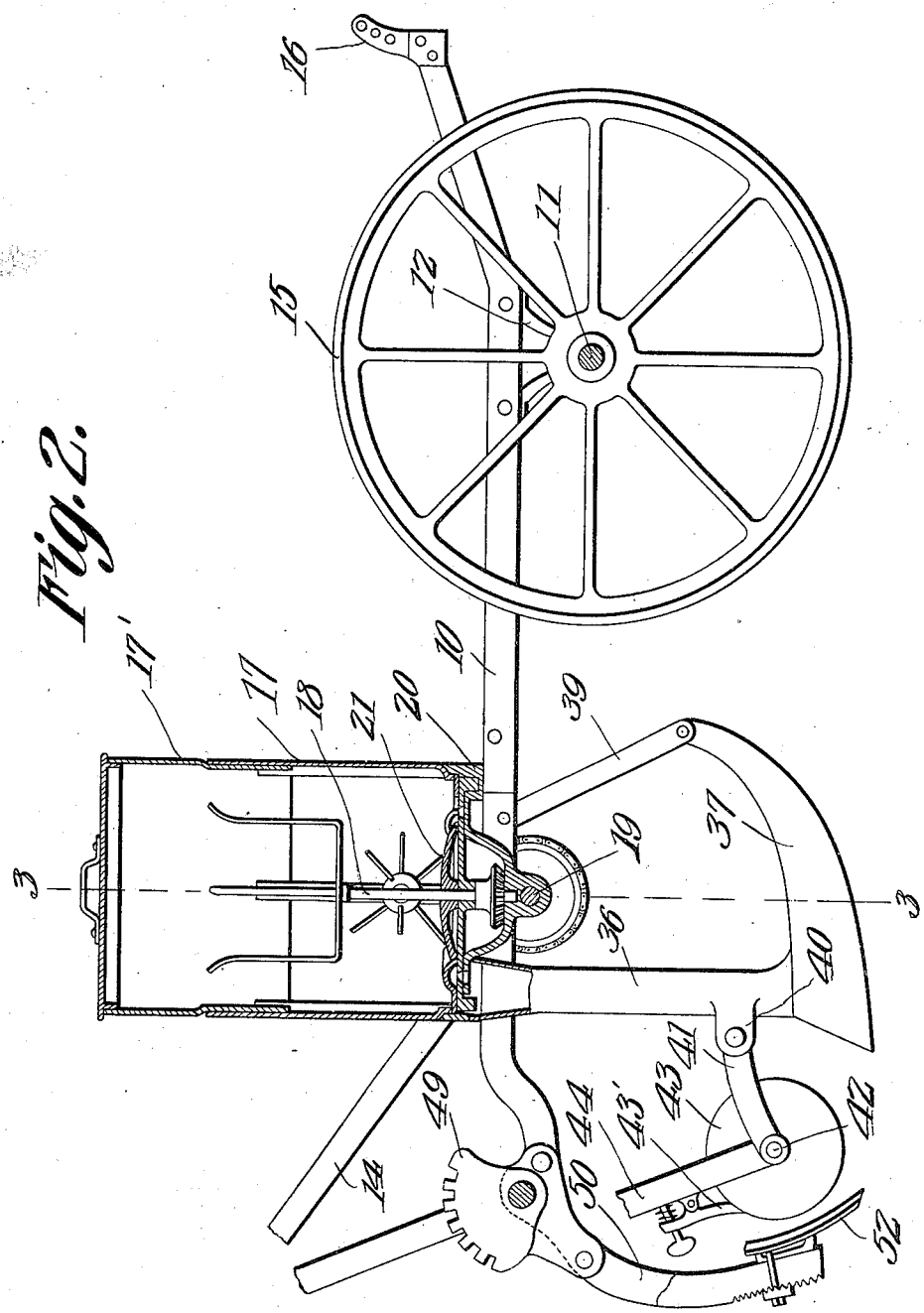

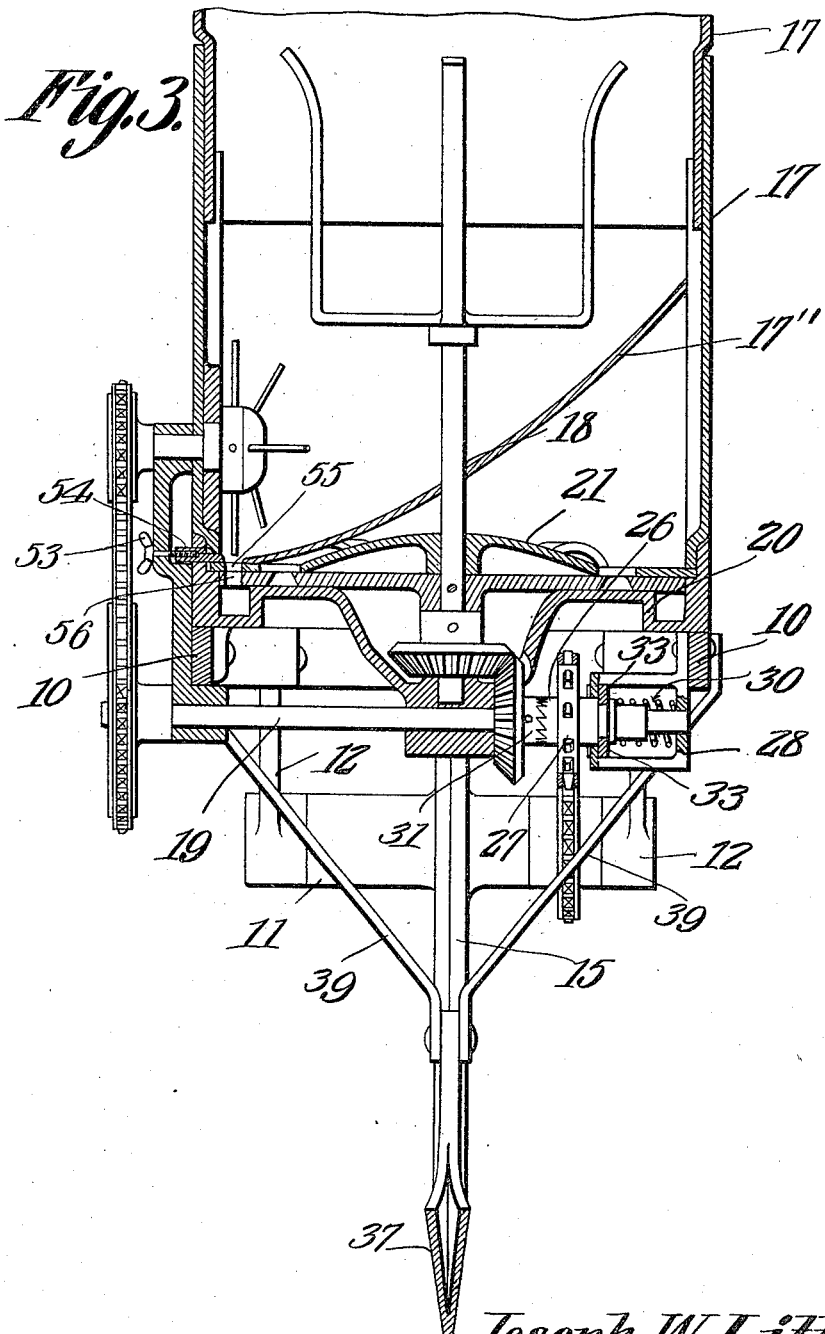

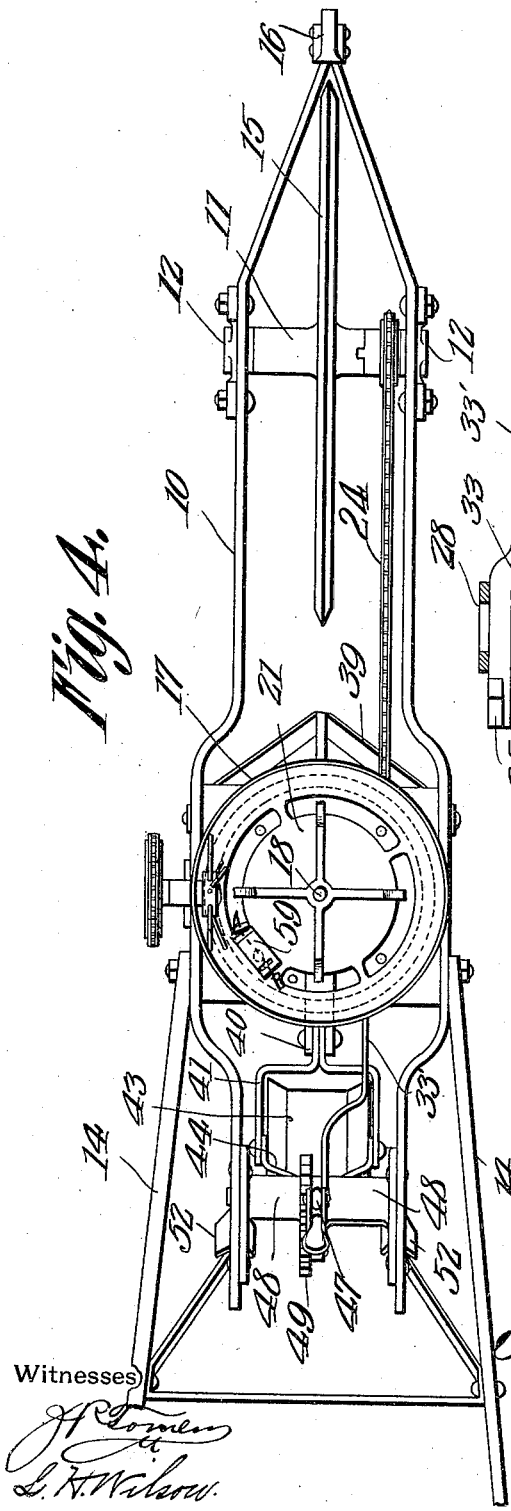

JOSEPH W. LITTLE, OF MEMPHIS, TENNESSEE.

SEED-PLANTER.

1,068,511.     Specification of Letters Patent.     Patented July 29, 1913.

Application filed March 18, 1912. Serial No. 684,545.

*To all whom it may concern:*

Be it known that I, JOSEPH W. LITTLE, a citizen of the United States, residing at Memphis, in the county of Shelby and State of Tennessee, have invented a new and useful Seed-Planter, of which the following is a specification.

This invention relates to an improvement in seed planters, the primary object of the present invention is to simplify and otherwise improve the constructions shown in Patent No. 838,345, dated December 11, 1906, and Patent No. 932,302, dated August 24, 1909.

A further object of the invention is to provide means for distributing a quantity of loose soil, over the ground which has been packed over the planted seed in order to prevent the soil from hardening to an extent which would tend to prevent the growth of the seed.

A further object of the invention is to provide simple and efficient means whereby the planter may be raised or lowered, the distributing mechanism being inactive, while the same is in a raised position.

In the drawings;—Figure 1 is a side elevation. Fig. 2 is a side elevation, the hopper being in section. Fig. 3 is a section taken on the line 3—3 of Fig. 2. Fig. 4 is a top plan. Fig. 5 is a detail view of the clutch. Fig. 6 is a sectional view of the clutch on the line 6—6 of Fig. 5. Fig. 7 is a detail view showing the manner of connecting the clutch actuating rod and the roller actuating bar to the operating lever. Fig. 8 is a detail view of the resiliently supported wiper arranged within the hopper, said view being taken on the line A—B Fig. 4.

In the drawings 10 designates a substantially V-shaped frame which is loosely mounted on the forwardly disposed axle or shaft 11 by means of brackets 12, the frame thus being freely lifted by means of handles 14, or forced upward in a manner which will be hereinafter described. Mounted on the shaft 11 is a drive wheel 15, which supports the frame, said frame being raised forward of the drive wheel, and provided with a clevis 16. Arranged on the frame is a hopper 17, in which is seated a second hopper 17′, the hopper 17 being of the construction shown in the above mentioned patents, and which is provided with agitators for assuring the proper distribution of the seed, the hopper being provided with a removable concaved bottom 17″ as in the former patent, the construction of the hopper and the distributing mechanism being practically the same as in said patents. The vertically disposed agitator shaft 18 is driven by means of a transversely disposed shaft 19, the shaft 18 passing through the bottom 20 of the hopper and the convex deflecting plate 21 arranged within the hopper. The shaft 19 is driven by means of a chain 24, a clutch 25 locking the sprocket over which said chain passes, to said shaft. The clutch consists of the loosely mounted serrated sleeve 26 on which the sprocket 27 is mounted, the end portion of the shaft 19 being supported by a frame 28 secured to the frame 10. A coil spring 30 surrounding the shaft and holding the serrated member in contact with a serrated member 31 fixed on the shaft 19, the spring contacting with the collar 32 arranged on the sleeve 26 and the frame. The clutch is actuated by a bifurcated member 33 which is connected to the link 33′ the bifurcated member extending within the frame and straddling the shaft 19. The end portions of the bifurcations are provided with tapered shoes 35 which when the member 33 is drawn back forces the beveled portions of the shoe in contact with the frame 28 overcoming the tendency of the spring and forcing the serrated end of the sleeve 26 out of contact with the serrated member fixed on the shaft 19 rendering the distributing mechanism inactive.

The hopper is provided with a downwardly extending spout 36 which is secured to the plow or furrow opener 37 and the end portion 38 of which is connected to the frame by a brace 39. The spout is formed with a bifurcated extension 40 which supports arms 41 which forms a bearing for a shaft 42 on which the spool drum or coverer 43 is mounted, a spring pressed scraper 43′ being arranged to remove the earth from said roller. A plurality of downwardly extending arms 44 are connected to said shaft, said arms being connected to the short arms 46 of the pivoted operating lever 47 which is supported by the segment 49. This segment is connected as at 48, to a downwardly curved extension 50 of the frame 10 and which is adapted to adjustably support shovels 52 the function of which will be hereinafter described. It will be noted that when the lever 47 is moved in one direction the shaft on which the spool roller is mounted will be raised but that when same is moved in the other direction the roller will be forced in contact with the ground moving the entire frame 10 on the axle. It will be noted that this movement of the frame is consonant with the releasing of the clutch 25, the rod 33' which actuates the clutch being connected to the lever 47, said rod being adjustable with respect to said lever, the lever being formed with perforations. Thus when the lever is moved in one direction the operating mechanism will be rendered inactive and the plow and shovels be raised out of contact with the ground.

In the planting of cotton seed the set screw 53 is manipulated withdrawing the sleeve 54 to uncover the opening 55, this opening registering with the opening 56. It has been found that in the planting of cotton seed, that when the ground is packed tight by the spool roller, the same readily becomes hard and a layer of earth is formed through which the seed sprouts with difficulty. To avoid this the shovels which are adjustably mounted on the curved downwardly extending portion of the frame are adapted to lay a layer of soft earth on the packed ground preventing the same from becoming hardened by the sun and rain.

In Fig. 8 is shown the spring controlled wiper or cut-off which consists of the pivotally supported member 57 which is formed with the offset wiper 58, this member 57 is supported by the housing 59 formed integral or attached to the bottom of the hopper. The members being held in contact with the revolving disk 61 by the spring 60, being adjusted against the tension of said spring by the set screw 70.

The many advantages of a machine of this character will be clearly apparent as it will be noted that the same forms a simple and easily constructed planter which may be driven across the ground and by a simple adjustment the distributing mechanism may be rendered inactive. It will also be noted that means are provided for facilitating the sprouting of the seed by covering the packed ground with a layer of soft earth.

What is claimed is:—

1. In a seed planter the combination with a frame, a combined supporting and drive wheel at one end thereof, and handles extending from the other end of the frame, of a furrow opener fixedly connected to the frame between the handles and drive wheel, a revoluble coverer, a link connection between the coverer and the furrow opener, said coverer being located back of the opener, a lever fulcrumed adjacent the handles, seed dropping mechanism, means operated by the drive wheel for actuating said mechanism, and separate means operated by the lever when moved in one direction, for disconnecting said drive wheel from the seed dropping mechanism and for forcing the coverer downwardly against the soil to elevate the furrow opener above the surface of the soil.

2. In a planter the combination with a frame, a combined supporting and drive wheel at one end thereof, seed dropping mechanism, and means for transmitting motion to said mechanism from the drive wheel, of a furrow opener fixedly connected to the back portion of the frame, a revoluble coverer back of the opener, a link connection between said coverer and the furrow opener, a lever, a link connection between the lever and the coverer, and means operated by the lever for simultaneously uncoupling the seed dropping mechanism from the motion transmitting means and for shifting the coverer downwardly to elevate the furrow opener above the surface of the soil.

3. In a planter the combination with a frame, a combined supporting and drive wheel at one end thereof, seed dropping mechanism, and means for transmitting motion to said mechanism from the drive wheel, of a furrow opener fixedly connected to the back portion of the frame, a revoluble coverer back of the opener, a link connection between said coverer and the furrow opener, a lever, a link connection between the lever and the coverer, means operated by the lever for simultaneously uncoupling the seed dropping mechanism from the motion transmitting means and for shifting the coverer downwardly to elevate the furrow opener above the surface of the soil, downwardly curved extensions upon the rear portion of the frame, said lever being carried by the extensions, handles connected to the extensions, and shovels adjustably attached to the extensions and disposed back of the coverer, said shovels and extensions being movable upwardly and downwardly with the frame.

In testimony that I claim the foregoing as my own, I have hereto affixed my signature in the presence of two witnesses.

JOSEPH W. LITTLE.

Witnesses:
Jno. D. Poehler,
F. M. Norfleet.